United States Patent
Kornilovich et al.

(10) Patent No.: US 10,786,950 B2
(45) Date of Patent: Sep. 29, 2020

(54) THREE-DIMENSIONAL (3D) PRINTING COMPOSITE BUILD MATERIAL COMPOSITION

(71) Applicant: Hewlett-Packard Development Company, L.P., Houston, TX (US)

(72) Inventors: Pavel Kornilovich, Corvallis, OR (US); Vladek Kasperchik, Corvallis, OR (US); Michael G. Monroe, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 325 days.

(21) Appl. No.: 15/763,167

(22) PCT Filed: Jan. 29, 2016

(86) PCT No.: PCT/US2016/015715
§ 371 (c)(1),
(2) Date: Mar. 26, 2018

(87) PCT Pub. No.: WO2017/131758
PCT Pub. Date: Aug. 3, 2017

(65) Prior Publication Data
US 2018/0264753 A1 Sep. 20, 2018

(51) Int. Cl.
*B29C 67/24* (2006.01)
*C08K 7/28* (2006.01)
(Continued)

(52) U.S. Cl.
CPC .......... *B29C 67/248* (2013.01); *B29C 64/165* (2017.08); *B29C 67/00* (2013.01);
(Continued)

(58) Field of Classification Search
CPC .............................. B29C 67/248; B33Y 10/00
See application file for complete search history.

(56) References Cited

U.S. PATENT DOCUMENTS

| 7,317,044 B2 | 1/2008 | Monsheimer et al. |
| 8,119,715 B2 | 2/2012 | Monsheimer et al. |
| (Continued) | | |

FOREIGN PATENT DOCUMENTS

| CN | 1976799 | 4/2012 |
| EP | 0287045 | 10/1988 |
| (Continued) | | |

OTHER PUBLICATIONS

TDS for Exolit® AP 422 ( https://www.clariant.com/en/Solutions/Products/2014/03/18/16/31/Exolit-AP-422?p=1) (Year: 2013).*
(Continued)

*Primary Examiner* — Leith S Shafi
*Assistant Examiner* — Nicholas R Krasnow
(74) *Attorney, Agent, or Firm* — Dierker & Kavanuagh PC

(57) ABSTRACT

A three-dimensional (3D) printing composite build material composition includes a polymer particle and an inorganic particle. The polymer particle is an aliphatic polyamide. The inorganic particle has an average particle size ranging from about 1 μm to about 100 μm. A mass ratio of the polymer particle to the inorganic particle in the composite build material composition ranges from about 5:2 to about 1:3.

5 Claims, 7 Drawing Sheets

(51) Int. Cl.
  *B33Y 30/00*  (2015.01)
  *B33Y 10/00*  (2015.01)
  *B29C 64/165*  (2017.01)
  *C08K 3/013*  (2018.01)
  *C08L 77/02*  (2006.01)
  *C08K 3/22*  (2006.01)
  *B33Y 70/00*  (2020.01)
  *B33Y 50/02*  (2015.01)
  *B29C 67/00*  (2017.01)

(52) U.S. Cl.
  CPC .............. *B33Y 10/00* (2014.12); *B33Y 30/00* (2014.12); *B33Y 50/02* (2014.12); *B33Y 70/00* (2014.12); *C08K 3/013* (2018.01); *C08K 3/22* (2013.01); *C08K 7/28* (2013.01); *C08L 77/02* (2013.01); *C08K 2003/2227* (2013.01)

(56) References Cited

U.S. PATENT DOCUMENTS

| | | |
|---|---|---|
| 2004/0175451 A1 | 9/2004 | Maekawa et al. |
| 2005/0003189 A1 | 1/2005 | Bredt et al. |
| 2005/0059757 A1 | 3/2005 | Bredt et al. |
| 2006/0223928 A1* | 10/2006 | Monsheimer ............ C08K 3/32 524/416 |
| 2007/0238056 A1 | 10/2007 | Baumann et al. |
| 2008/0122141 A1* | 5/2008 | Bedal ...................... C08J 5/00 264/405 |
| 2012/0041132 A1 | 2/2012 | Monsheimer et al. |
| 2012/0242788 A1* | 9/2012 | Chuang ............ G08B 13/19602 348/36 |
| 2014/0031967 A1* | 1/2014 | Unger .................... B33Y 50/00 700/119 |
| 2014/0141168 A1 | 5/2014 | Rodgers |
| 2015/0048209 A1* | 2/2015 | Hoyt .................. B23K 15/0086 244/131 |
| 2015/0064375 A1* | 3/2015 | Kunstadt ................ B29C 65/66 428/34.1 |
| 2017/0253702 A1* | 9/2017 | Ma .......................... C08J 3/215 |
| 2020/0052409 A1* | 2/2020 | Scannell ................ B33Y 80/00 |
| 2020/0063776 A1* | 2/2020 | Bastian ................. F16B 12/125 |
| 2020/0085409 A1* | 3/2020 | Grinfeld ............. G01S 15/8915 |
| 2020/0115186 A1* | 4/2020 | Pearson ................ B65H 75/48 |
| 2020/0139626 A1* | 5/2020 | Pan ........................ B29C 64/218 |
| 2020/0146868 A1* | 5/2020 | Schweitzer ............... A61F 5/11 |
| 2020/0169646 A1* | 5/2020 | Xu .......................... B41J 2/2128 |
| 2020/0191668 A1* | 6/2020 | Xia .......................... G01L 1/241 |

FOREIGN PATENT DOCUMENTS

| | | |
|---|---|---|
| WO | WO-2015165361 | 11/2015 |
| WO | WO-2017014784 A1 | 1/2017 |

OTHER PUBLICATIONS

Wang, Yungan,"3D Printing", May 31, 2014, p. 58, Huazhong University of Science and Technology Press, China.

Yuan, Hongling, "Fast Manufacturing Technologies and Applications", Jan. 31, 2015, p. 213, Aviation Industry Press, China.

* cited by examiner

THREE-DIMENSIONAL (3D) PRINTING COMPOSITE BUILD MATERIAL COMPOSITION

BACKGROUND

Three-dimensional (3D) printing may be an additive printing process used to make three-dimensional solid objects from a digital model. 3D printing is often used in rapid product prototyping, mold generation, mold master generation, and short run manufacturing. 3D printing techniques are considered additive processes because they involve the combined application of successive layers of material. This is unlike traditional machining processes, which often rely upon the removal of material to create the final object. Materials used in 3D printing often require curing or fusing, which for some materials may be accomplished using heat-assisted extrusion, melting, or sintering, and for other materials may be accomplished using digital light projection technology. Other 3D printing processes utilize different mechanisms, e.g., printing a binder glue, for creating 3D shapes.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
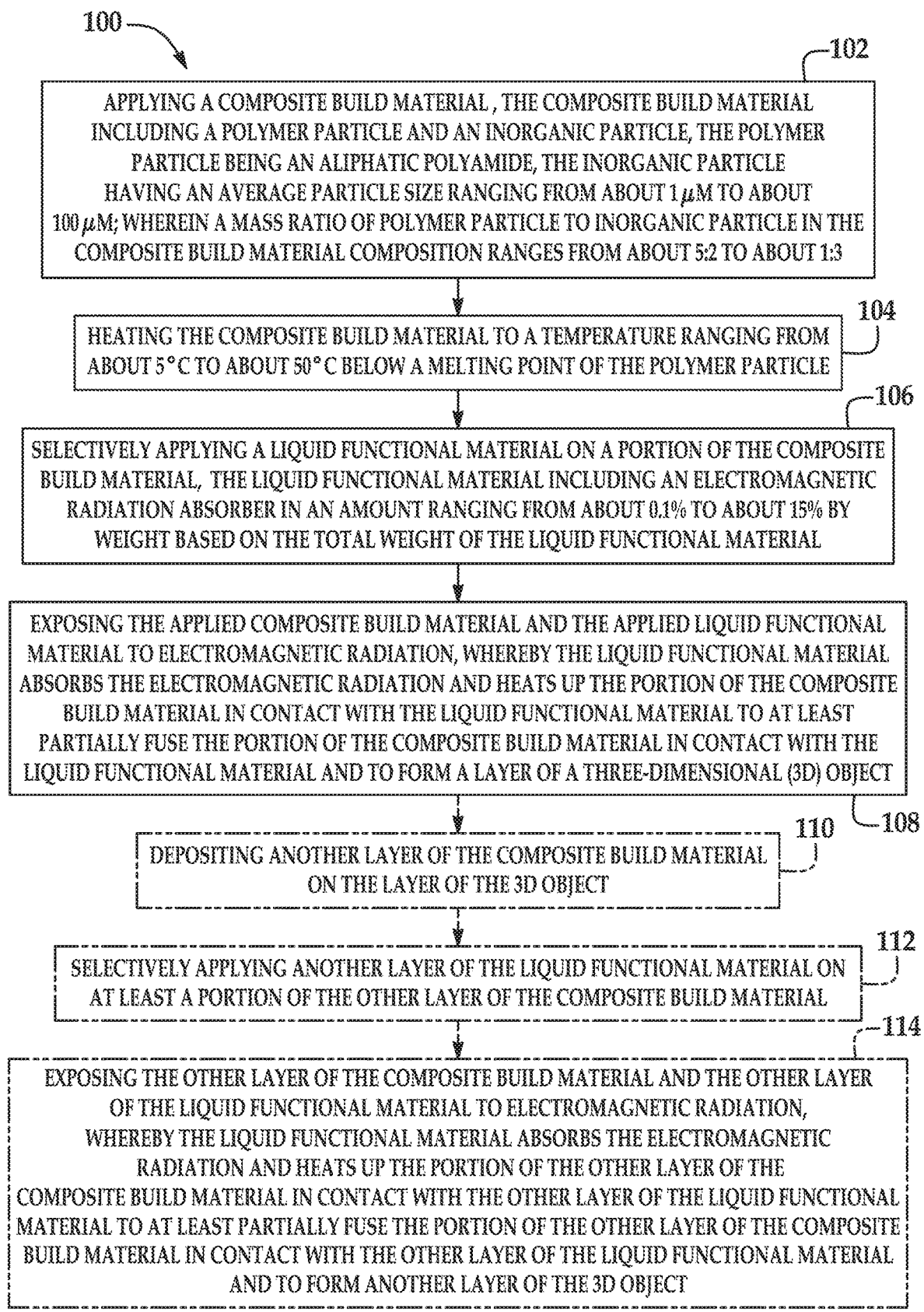
FIG. 1 is a flow diagram illustrating an example of a 3D printing method disclosed herein.

Examples of a three-dimensional (3D) printing build material composition are disclosed herein. The 3D printing build material composition is a composite of a polymer particle and an inorganic particle. The polymer particle is an aliphatic polyamide having a low melting temperature (e.g., from about 80° C. to about 300° C.) and a low melt viscosity, while the inorganic particle material has a high melting temperature (e.g., typically above 1000° C.) and a surface that is wettable by the melted polymer particle.

The surface chemistry of the inorganic particle may contribute to the surface being wettable by the melted polymer particle. For example, alumina (one example of the inorganic particle disclosed herein) may have a population of hydroxyl groups (—OH groups) at the surface and may act as a weak acid. The aliphatic polyamides have amido groups (—CO—NH$_2$—) in their backbone structure. The amido groups are latent bases, which may have a high affinity to the alumina surface either through acid-base interactions or hydrogen bonding. The other examples of inorganic particles disclosed herein also have suitable surface chemistry that enables the melted polymer particle to wet the surface thereof.

By "low melt viscosity" of the polymer particle, it is meant that the polymer melt has a viscosity that enables it to act as a free-flowing fluid that can wet through the inorganic particles (e.g., wick between inorganic particles) when in contact therewith. The viscosity of melt polymers is dependent on temperature. In an example, the melt viscosity of the polymer particle (at operating temperatures ranging from about 180° C. to about 200° C.) during a 3D build ranges from about 50 Pa·s (pascal-second) to about 350 Pa·s. The low melt viscosity of the polymer particle also contributes to the ability of the polymer particles to wet an increased fraction of inorganic polymers in the composite build material.

During 3D printing, these properties of the polymer particle and the inorganic material enable the polymer particles to rapidly melt and readily wet the surface of the inorganic particles, without melting the inorganic particles. In an example, the polymer melt can wet the inorganic particles within a time ranging from fractions of seconds (e.g., from about 10 milliseconds (ms) to about 30 ms) to a few minutes, depending upon the polymer melt viscosity and the volume of inorganic material that is to be wet. For an individual composite build material layer that is about 100 μm thick, rapid wetting may range from <1 second to 5 seconds.

Also during 3D printing, coalescence of melted polymer particles forms a continuous polymer phase and the inorganic particles are capable of intercalating into the continuous polymer phase. The reflow time of the polymer phase may increase in the presence of inorganic particles—as they can act as obstacles for polymer flow. The time increase is not dramatic though, and as such, the presence of the inorganic particles does not significantly increase the melt viscosity of the polymer, and in turn, does not significantly increase heating and/or fusing times (i.e., printing speed is not deleteriously affected).

As previously described, the aliphatic polyamide polymer particles are able to melt and rapidly wet the inorganic particles. It has unexpectedly been found that this interaction does not utilize any compatibilizer (e.g., silane coupling agent), which is often utilized to enhance the adhesion between polymer matrices and inorganic filler particles.

The polymer particles and inorganic particles of the composite build material disclosed herein are mixed together, but are not compounded into a single build material particle containing both polymer and inorganic material. Rather, compounding of the materials takes place during the 3D printing process, when the polymer particles melt and the inorganic particles become embedded within the polymer melt.

The solidification of the polymer melt having the inorganic particles embedded therein forms an individual fused layer of a 3D object, which is composed of a polymer-inorganic composite. The resulting 3D object exhibits enhanced mechanical properties, such as increased stiffness, increased dimensional stability (e.g., shape, size, etc.) at elevated temperatures, and reduced coefficient of thermal expansion (CTE). A reduced CTE may also minimize the extent of thermal warpage of 3D objects caused by temperature gradients that may appear across a fabrication bed (or other support) during the printing process.

For example, 3D objects formed from examples of the composite build material composition disclosed herein may exhibit an increase in the material stiffness that is proportional to the inorganic particle mass fraction at temperatures up to a melting point of the polymer particle, as well as a decrease in the coefficient of thermal expansion (CTE) at temperatures at which the polymer matrix is thermally stable (e.g., from 0 to 120° C., depending upon the polymer particles used). The increase of the material stiffness for the example 3D objects preserved at elevated temperatures, as well as reduced coefficient of thermal expansion of the example 3D objects at various temperatures indicate that mixing of polymer and inorganic particles may significantly improve mechanical properties and dimensional stability of 3D objects printed from polymer particles.

An example of the 3D printing method 100 is depicted in FIG. 1, and an example of the printing system 10 used throughout the method 100 is shown in FIGS. 3A through 3E. It is to be understood that the method 100 shown in FIG. 1 will be discussed in detail herein, and in some instances, FIGS. 2, and 3A through 3E will be discussed in conjunction with FIG. 1.

Figure 3A:
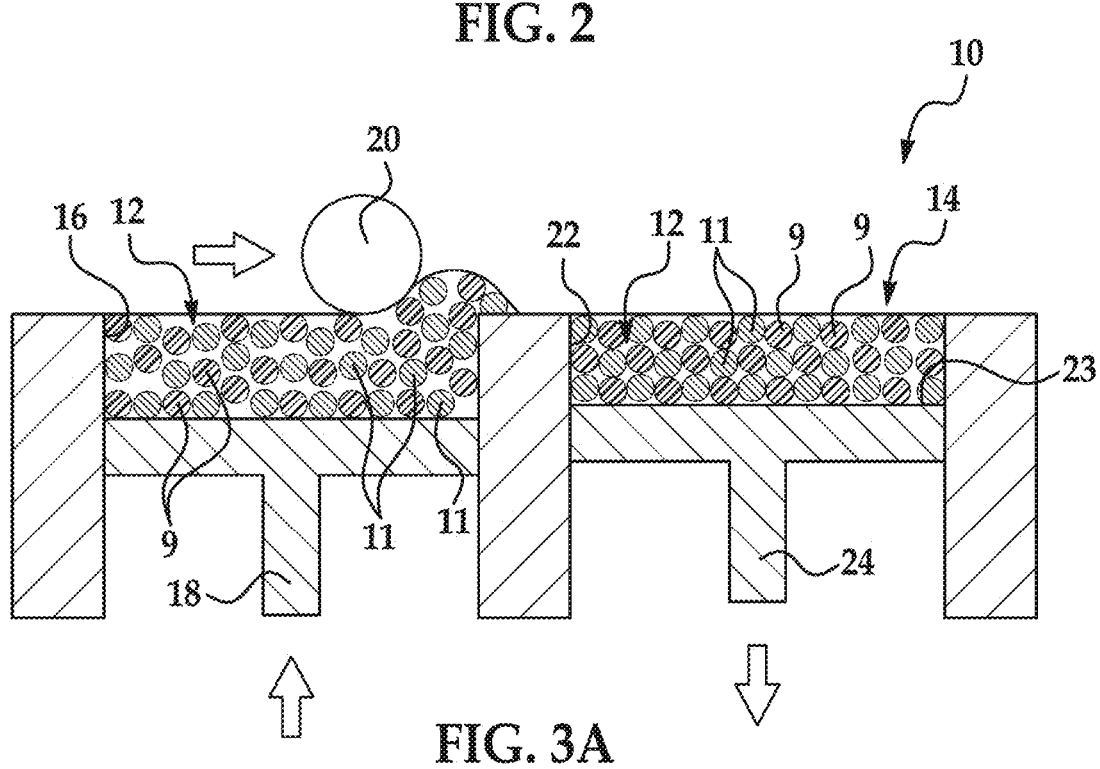
FIGS. 3A through 3D are semi-schematic, cross-sectional views showing formation of one layer of a 3D object using an example of the build material composition, 3D printing method and system disclosed herein.

As shown in FIG. 1 (at reference number 102) and in FIG. 3A, an example of the method 100 includes applying a composite build material composition 12 using the 3D printing system 10. In the example shown in FIG. 3A, one layer 14 of the composite build material composition 12 has been applied, as will be discussed in more detail below.

Figure 2:
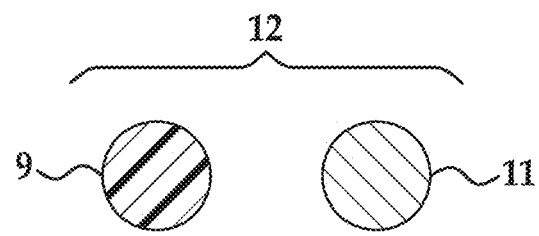
FIG. 2 is a semi-schematic cross-sectional view of examples of the build material composition used to form layer(s) of a 3D object.

An example of the composite build material composition 12 includes a polymer particle 9 and an inorganic particle 11 mixed with the polymer particle 9, as shown in FIG. 2. The particles 9, 11 are mixed together as separate particles 9, 11, and are not in a compounded state (i.e., single particles including both polymer and inorganic material).

The polymer particle 9 may be chosen from any polymer particle having the low melting temperature and low melt viscosity. The low melting temperature of suitable polymer particles 9 ranges from about 80° C. to about 300° C. In some examples, the polymer particle 9 has a sharp melting peak (i.e., a well-defined melting temperature) that is within the given range.

In an example, the low melt viscosity of suitable polymer particles 9 ranges from about 50 Pa·s (pascal-second) to about 350 Pa·s (at 180° C. to about 200° C.).

Some examples of suitable polymer particles 9 include aliphatic polyamides. Some specific examples of aliphatic polyamides (PAs) include PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc. In an example, the aliphatic polyamide is PA 11/nylon 11 or PA 12/nylon 12 or mixtures thereof. In a further example, the aliphatic polyamide is PA 12/nylon 12.

The polymer particle 9, in an example, has an average particle size ranging from about 1 μm to about 250 μm. In some instances, the upper limit for the polymer particle size is 200 μm. In another example, the polymer particle 9 has an average particle size ranging from about 10 μm to about 100 μm.

The inorganic particle 11 may be chosen from any inorganic particle having the high melting temperature and having the surface that is wettable by the melted polymer particle 9.

The high melting temperature of the inorganic particle 11 may be at least 1000° C. In some examples, the inorganic particle 11 melting temperature is well above 1000° C., examples of which include about 2070° C., about 2800° C., or higher.

Some examples of suitable inorganic particles 11 include metal oxides, semiconductor oxides, inorganic glasses, carbides, nitrides, borides, or combinations thereof. Some specific examples include alumina ($Al_2O_3$), $Na_2O/CaO/SiO_2$ glass (soda-lime glass), silicon dioxide ($SiO_2$), zirconia ($ZrO_2$), titanium dioxide ($TiO_2$), or combinations thereof. As an example of one suitable combination, 30 wt % glass may be mixed with 70 wt % alumina.

The inorganic particle 11 has an average particle size ranging from about 1 μm to about 100 μm. In another example, the inorganic particle 11 is a particle having a particle size ranging from about 3 μm to about 40 μm. In still another example, the inorganic particle 11 is a particle having a particle size ranging from about 5 μm to about 20 μm.

In terms of size, the inorganic particle 11 may be different in size than, or similar in size to the polymer particle 9. When differently sized particles 9, 11 are used, it is meant that the average particle size of the inorganic particle 11 and the average particle size of the polymer particle 9 differ by more than about 10 μm. For differently sized particles 9, 11, the polymer particle 9 may be larger of the two particles 9, 11. The inorganic particles 11 may be heavier than the polymer particles 9, and therefore to achieve the suitable mass ratio for the composition 12 (described below), smaller inorganic particles 11 may be desirable. Additionally, the smaller inorganic particles 11 may fill spaces or voids between the larger polymer particles 9, which can help achieve a substantially uniform mixture. When similarly sized particles 9, 11 are used, it is meant that the average particle size of the inorganic particle 11 and the average particle size of the polymer particle 9 do not differ by more than about 10 μm. A minimal size differential between the polymer particle 9 and the inorganic particle 11 may enable the inorganic particles 11 to be mixed substantially uniformly with the polymer particles 9.

A mass ratio of the polymer particle 9 to inorganic particle 11 (polymer particle:inorganic particle) in the composite build material composition 12 ranges from about 5:2 to about 1:3. In an example, the mass ratio of the polymer particle 9 to inorganic particle 11 (polymer particle:inorganic particle) in the composite build material composition 12 ranges from about 1:1 to about 1:2. In an example, both the polymer particle 9 and the inorganic particle 11 are uniformly distributed throughout the composite build material composition 12.

The shape of the particles 9, 11 making up the composite build material composition 12 may be the same or different. In an example, the build material composition 12 particles 9, 11 have spherical or near-spherical shapes. Build material composition 12 particles that have a sphericity of >0.84 are considered herein to be spherical or near-spherical. Thus, any build material composition 12 particles having a sphericity of <0.84 are non-spherical. When the particles 9, 11 are spherical, the particle size refers to the diameter of the spherical particle 9, 11. When the particles 9, 11 are non-spherical, the particle size refers to the average diameter of the non-spherical particle 9, 11 (i.e., the average of multiple dimensions across the non-spherical particle) or the effective diameter (i.e., the diameter of a sphere with the same mass and density as the non-spherical particle 9, 11).

In an example, the composite build material composition 12 is made up of the polymer particle 9 and the inorganic particle 11, and no other components. In another example, the composite build material composition 12 is made up of the polymer particle 9 and the inorganic particle 11, as well as charge agent(s) and/or flow aid(s) and/or antioxidant(s) mixed among the particles.

Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material composition 12 particles.

Flow aid(s) may be added to improve the coating flowability of the build material composition 12. Flow aid(s) may be particularly desirable when the build material composition 12 particles are less than 25 µm in size. The flow aid improves the flowability of the build material composition 12 by reducing the friction, the lateral drag, and the tribo-charge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), titanium dioxide, zinc oxide, or polydimethylsiloxane (E900). In an example, the flow aid is added in an amount up to 2 wt % based upon the total wt % of the build material composition 12; or in an amount ranging from 0.5 wt % to 1 wt % based upon the total wt % of the build material composition 12 particles.

Referring now to FIG. 3A, the printing system 10 for forming the 3D object includes a supply bed 16 (including a supply of the composite build material composition 12), a delivery piston 18, a roller 20, a fabrication bed 22 (having a contact surface 23), and a fabrication piston 24. While not shown, the printing system 10 may also include a central fabrication/build bed and two side supply beds. As an example, a first supply bed may be raised higher than the central fabrication bed, which is raised higher than the second supply bed. In this example, a roller may be moved in a suitable direction to push the build material composition 12 (from the first supply bed) onto the central fabrication bed, where excess build material composition 12 is pushed into the second supply bed (i.e., the supply bed at the lower position). In this example, the positioning of the beds and the process may be reversed.

In the printing system 10, each of the physical elements may be operatively connected to a central processing unit (CPU) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the composite build material composition 12, the liquid functional material 26, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the composite build material composition 12 out of the opening in the supply bed 16, and the fabrication piston 24 may be programmed to move in the opposite direction of the delivery piston 18 in order to increase the depth of the fabrication bed 22.

The delivery piston 18 will advance enough so that when the roller 20 pushes the composite build material composition 12 into the fabrication bed 22 and onto the contact surface 23, the depth of the fabrication bed 22 is sufficient so that a layer 14 of the build material composition 12 may be formed in the bed 22. The roller 20 is capable of spreading the composite build material composition 12 into the fabrication bed 22 to form the layer 14, which is relatively uniform in thickness (as shown at reference number 102 in FIG. 1 and in FIG. 3A). In an example, the thickness of the layer 14 ranges from about 10 µm to about 500 µm, although thinner (e.g., 5 µm) or thicker (e.g., 800 µm) layers may also be used. In another example, the thickness of the layer 14 ranges from about 110 µm to about 150 µm.

As mentioned above, the composite build material composition 12 includes a mixture of a plurality of polymer particles 9 and a plurality of inorganic particles 11.

It is to be understood that the roller 20 is a build material distributor that may be replaced by other tools, such as a blade that may be desirable for spreading different types of powders, or a combination of a roller and a blade. When applying the composite build material composition 12, a transversal speed of 0.1 inches per second to 100 inches per second may be used. In an example, the transversal speed is about 5 inches per second.

The supply bed 22 that is shown is one example, and could be replaced with another suitable delivery system to supply the composite build material composition 12 to the fabrication bed 22. Examples of other suitable delivery systems or distributors include a hopper, an auger conveyer, or the like.

The fabrication bed 22 that is shown is also one example, and could be replaced with another support member, such as a platen, a print bed, a glass plate, or another build surface.

Figure 3B:
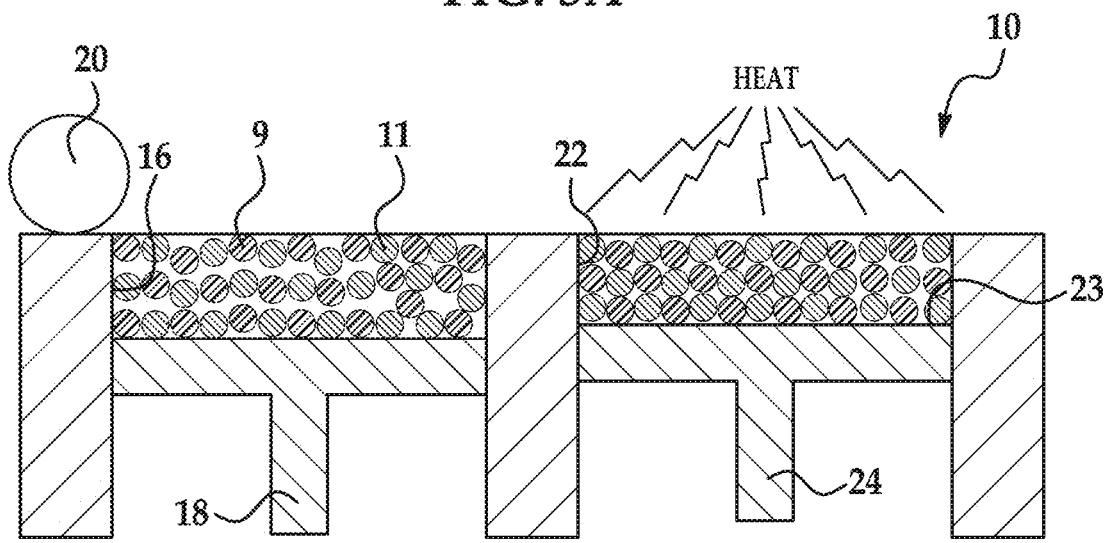

After the layer 14 of the composite build material composition 12 is introduced into the fabrication bed 22, the layer 14 may be exposed to heating (as shown at reference number 104 in FIG. 1 and in FIG. 3B). Heating, e.g., by exposing to radiation 36 via radiation source 34 (FIG. 3D), is performed to pre-heat (but not melt/fuse) the composite build material composition 12, and thus it is desirable that the heating temperature be below the melting point of the polymer particle 9 of the composite build material composition 12. As such, the temperature selected will depend upon the polymer particle 9 that is used. As examples, the heating temperature may be from about 5° C. to about 50° C. below the melting point of the polymer particle 9. In an example, the heating temperature ranges from about 130° C. to about 180° C. In another example, the heating temperature ranges from about 150° C. to about 160° C.

Pre-heating the layer 14 of the composite build material composition 12 may be accomplished using any suitable heat source that exposes all of the composite build material composition 12 in the fabrication bed 22 to the heat. Examples of the heat source include an electromagnetic radiation source, such as a visible/infrared light source, microwave, etc., or a resistive heater(s) that is built into the fabrication and supply beds 22, 16. Pre-heating may be used to ensure that the composite build material composition 12 is at a uniform temperature, which may help with improving cycle time.

Figure 3C:
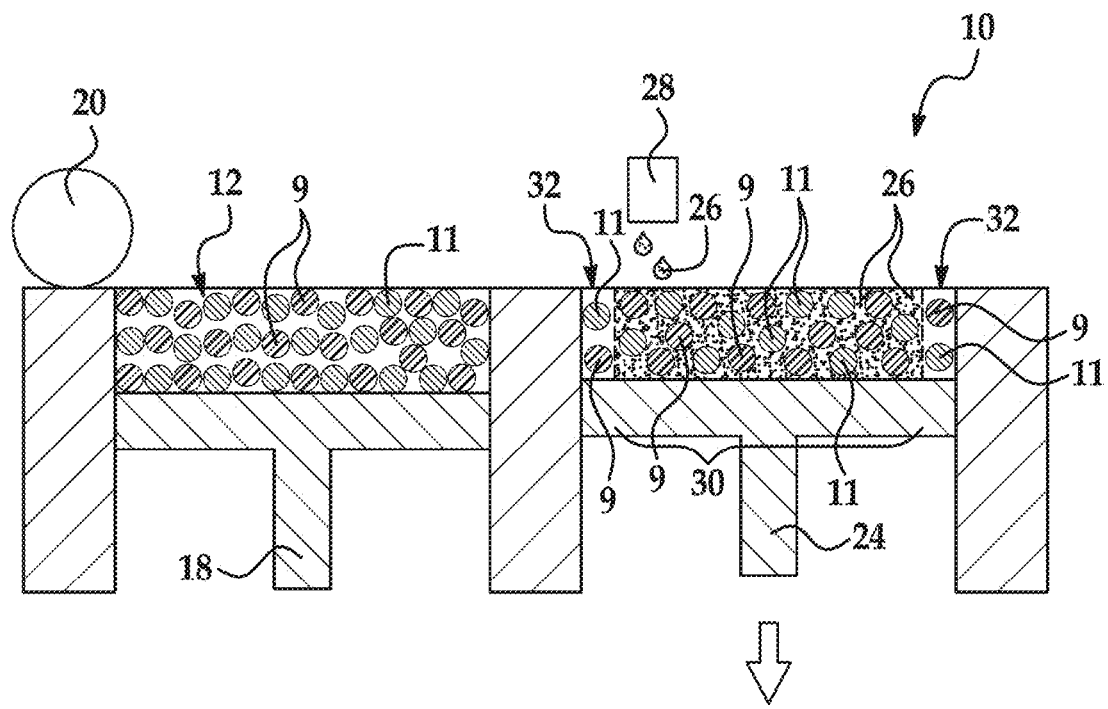

After pre-heating the layer 14, the liquid functional material 26 is selectively applied on at least a portion of the composite build material composition 12 in the layer 14, as shown at reference number 106 in FIG. 1 and in FIG. 3C. The selective application of the liquid functional material 26 patterns the composite build material composition 12. The liquid functional material 26 may be selectively applied according to a pattern of a cross-section (which is parallel to the contact surface 23) for the layer 40 of the 3D object that is to be formed.

The liquid functional material 26 (including the active material, discussed further herein) enhances the absorbance of electromagnetic radiation 36, converts the absorbed electromagnetic radiation 36 to thermal energy, and promotes the transfer of the thermal heat to the build material composition 12 in contact with the liquid functional material 26 (i.e., in the area(s)/portion(s) 30). In an example, the liquid functional material 26 sufficiently elevates the temperature of the composite build material composition 12 in the area(s)/portion(s) 30 above the melting point(s) of the polymer particles 9, allowing the polymer particles 9 to rapidly melt. The melted polymer wets the surface of the inorganic particles 11. More particularly, as the polymer particles 9 melt, they coalesce to produce a continuous phase polymer which embeds the inorganic particles 11. Upon melting, the polymer particles 9 fuse together, thus trapping the inorganic particles 11 into the lattice of the continuous phase polymer.

Cooling and solidification of the continuous phase polymer, having the inorganic particles 11 embedded therein, forms a layer 40 of the 3D object. This layer 40 is made up of a composite of the solidified polymer having the inorganic particles 11 embedded therein. The layer 40 may exhibit enhanced mechanical and thermal properties compared to a layer built from the same polymer particles 9 in the absence of the inorganic particles 11.

Figure 4:
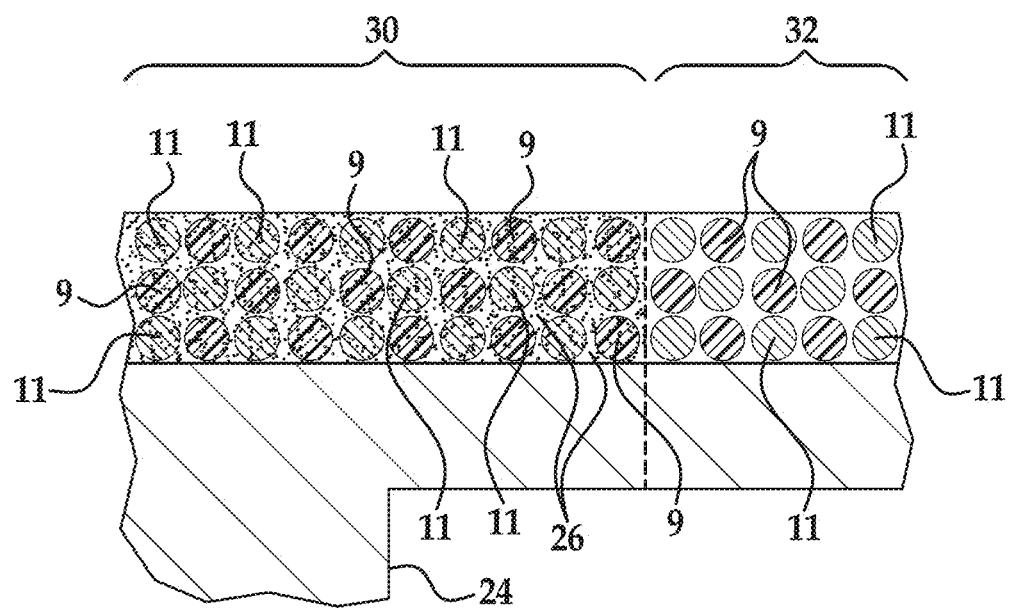
FIG. 4 is an enlarged, semi-schematic, cut-away cross-sectional view of a portion of FIG. 3C.

FIG. 4 is a semi-schematic, cut-away cross-sectional view of a portion of FIG. 3C. It is to be understood that this cross-section is perpendicular to the contact surface 23 and is not the same as the cross-section of the pattern of the layer 40 that is to be formed. The view in FIG. 4 illustrates some of the composite build material composition 12 on the contact surface 23 after the liquid functional material 26 is applied thereon. As depicted, the liquid functional material 26 penetrates into at least some of the voids between the particles 9, 11' of the build material composition 12 within the portion 30. The liquid functional material 26 is capable of enhancing melting, fusing, curing, etc. of the composite build material composition 12 in the portion 30. In the portion/area 32, the particles 9, 11 have not had liquid functional material 26 applied thereto.

As illustrated in FIG. 3C, the liquid functional material 26 may be dispensed from an inkjet applicator 28 (e.g., a thermal inkjet printhead or a piezoelectric inkjet printhead). While a single inkjet applicator 28 is shown in FIG. 3C, it is to be understood that multiple inkjet applicators may be used that span the width of the fabrication bed 22. The inkjet applicator(s) 28 may be attached to a moving XY stage or a translational carriage (neither of which is shown) that moves the inkjet applicator(s) 28 adjacent to the fabrication bed 22 in order to deposit the liquid functional material 26 in desirable area(s).

The inkjet applicator(s) 28 may be programmed to receive commands from the central processing unit and to deposit the liquid functional material 26 according to a pattern of a cross-section for the layer of the 3D object that is to be formed. As used herein, the cross-section of the layer of the 3D object to be formed refers to the cross-section that is parallel to the contact surface 23. The inkjet applicator(s) 28 selectively applies the liquid functional material 26 on those portions of the layer 14 that are to be fused to become one layer 40 of the 3D object. As an example, if the first layer 40 is to be shaped like a cube or cylinder, liquid functional material 26 will be deposited in a square pattern or a circular pattern (from a top view), respectively, on at least a portion of the layer 14 of the composite build material composition 12. In the example shown in FIG. 3C, the liquid functional material 26 is deposited in a square pattern on the area or portion 30 of the layer 14, and not on the areas or portions 32.

The liquid functional material 26 used in the examples disclosed herein is aqueous based. The aqueous nature and particular components of the liquid functional material 26 enhance the wetting properties of the liquid functional material 26, even on the composite build material composition 12, which may be hydrophobic in some examples. This enables the liquid functional material 26 to be printed more uniformly over the composite build material composition 12 surface.

Examples of suitable liquid functional materials 26 are water-based dispersions including a radiation absorbing agent (i.e., an electromagnetic radiation absorber or an active material). The radiation absorbing agent may be selected to absorb any wavelength in the electromagnetic spectrum. As examples, the radiation absorbing agent may be capable of absorbing IR radiation (i.e., a wavelength of about 700 nm to about 1 mm, including near-IR radiation (i.e., a wavelength of about 750 nm to about 1.4 µm)), ultraviolet radiation (i.e., a wavelength of about 10 nm to about 380 nm), visible radiation (i.e., a wavelength from about 390 nm to about 700 nm), microwave radiation (i.e., a wavelength of about 1 mm to about 1 m), radio radiation (i.e., a wavelength from about 1 m to about 1000 m), or a combination thereof. In an example, the radiation absorbing agent may be selected to absorb optical radiation, such as UV to IR, having wavelengths ranging from about 100 nm to about 1 mm, or from about 200 nm to about 3,000 nm. An example of the radiation absorbing agent may be a susceptor, such as carbon black, graphite, magnetite, and/or various iron oxides. Carbon black may also be used as an IR (including near-IR) radiation absorber. Examples of other suitable radiation absorbers include near infrared light absorber dyes or pigments or visible dyes of any suitable color.

Some examples of near infrared colorants are produced by Fabricolor, Eastman Kodak, or Yamamoto, and any of these colorants may be used in the liquid functional material 26. As one example, the liquid functional material 26 may be an ink-type formulation including carbon black as the active material. Examples of this ink-type formulation are commercially known as CM997A, 516458, C18928, C93848, C93808, or the like, all of which are available from Hewlett-Packard Company. Examples of other pigment based inks include the commercially available inks CM993A and CE042A, available from HP Inc.

The amount of the active material that is present in the liquid functional material 26 may range from about 0.1 wt % to about 15 wt % based on the total wt % of the liquid functional material 26. In other examples, the amount of the active material present in liquid functional material 26 ranges from greater than 1.0 wt % up to about 10.0 wt %. In still other examples, the amount of the active material present in liquid functional material 26 ranges from greater than 3.0 wt % up to about 5.0 wt %. It is believed that these active material/pigment loadings provide a balance between the liquid functional material 26 having jetting reliability and electromagnetic radiation absorbance efficiency. When the active material is present in an ink-type formulation, the amount of the ink-type formulation that is added to the liquid functional material 26 may be selected so that the amount of the active material in the liquid functional material 26 is within the given ranges.

The liquid functional material 26 may also include additional components. For example, the liquid functional material 26 may include a surfactant, a co-solvent, a biocide, a humectant, an anti-kogation agent, or combinations thereof.

Surfactant(s) may be used to improve the wetting properties of the liquid functional material 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the liquid functional material 26 may range from about 0.2 wt % to about 1.5 wt % based on the total wt % of the liquid functional material 26. In another example, the total amount of surfactant(s) ranges from about 0.5 wt % to about 1.4 wt %.

The type and amount of surfactant may be selected so that a contact angle with a contact line of the build material composition 12 is less than 90°. In some instances, the contact angle may be less than 45°, which may be desirable to ensure wetting of the build material composition 12 with the liquid functional material 26.

A co-solvent may be included in the liquid functional material 26 to speed evaporation of the liquid functional material 26 after application to the composite build material composition 12. Some examples of the co-solvent include 1-(2-hydroxyethyl)-2-pyrrolidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof. In an example, 2-Pyrrolidinone is selected as the co-solvent.

The co-solvent(s) may be present in the liquid functional material 26 in a total amount ranging from about 1 wt % to about 50 wt % based upon the total wt % of the liquid functional material 26.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the liquid functional material 26.

When included in the liquid functional material 26, the humectant is present in an amount ranging from about 0.1 wt % to about 50 wt %. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof.

An anti-kogation agent may be included in the liquid functional material 26. Kogation refers to the deposit of dried ink (e.g., liquid functional material 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the liquid functional material 26 may range from greater than 0.20 wt % to about 07 wt % based on the total wt % of the liquid functional material 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.2 wt %.

The balance of the liquid functional material 26 is water. In an example, the amount of water ranges from about 70 wt % to about 95 wt % of the total weight of the liquid functional material 26. However, it is to be understood that the amount of water may vary, depending upon the amounts of the other liquid functional material components.

The liquid functional material 26 may be a colored (e.g., CMYK) inkjet ink, or weakly colored (i.e., almost colorless in the visible range) inkjet ink. Table 1 provides some examples of a colored liquid functional material 26.

TABLE 1

Example Colored Liquid functional materials

| | Black (K) (wt %) | Cyan (wt %) | Magenta (wt %) | Yellow (wt %) |
|---|---|---|---|---|
| Colorant/Active Material | | | | |
| K pigment dispersion from DIC Corp. | 3.5 | | | |
| Cyan pigment dispersion from DIC Corp. | | 4.0 | | |
| Magenta pigment dispersion from DIC Corp. | | | 4.0 | |
| Yellow pigment dispersion from DIC Corp. | | | | 4.0 |
| Vehicle | | | | |
| Co-solvents | | | | |
| 2-Pyrrolidinone | 15.00 | 15.00 | 15.00 | 15.00 |
| 1-(2-Hydroxyethyl)-2-pyrrolidone | 5.00 | 5.00 | 5.00 | 5.00 |
| Surfactants | | | | |
| Surfynol ® SEF | 0.85 | 0.65 | 0.65 | 0.65 |
| Additives | | | | |
| Crodafos ® O3A | 0.50 | 1.00 | 0.75 | 0.75 |
| Biocide | | | | |
| Proxel GXL (as is) | 0.18 | 0.18 | 0.18 | 0.18 |
| Kordek MLX | 0.14 | 0.14 | 0.14 | 0.14 |
| Water | balance | balance | balance | balance |
| pH (adjusted with KOH) | 9.2 to 9.4 | 9.2 to 9.4 | 9.2 to 9.4 | 9.2 to 9.4 |

While a single liquid functional material 26 fluid is shown in FIG. 3C, it is to be understood that a plurality of fluids may be used. For example, different fluids with different functions may be used. As an example, a liquid functional material 26 may be used to provide color and another liquid functional material 26 may be used to incorporate the active material for fusing enhancement.

Figure 3D:
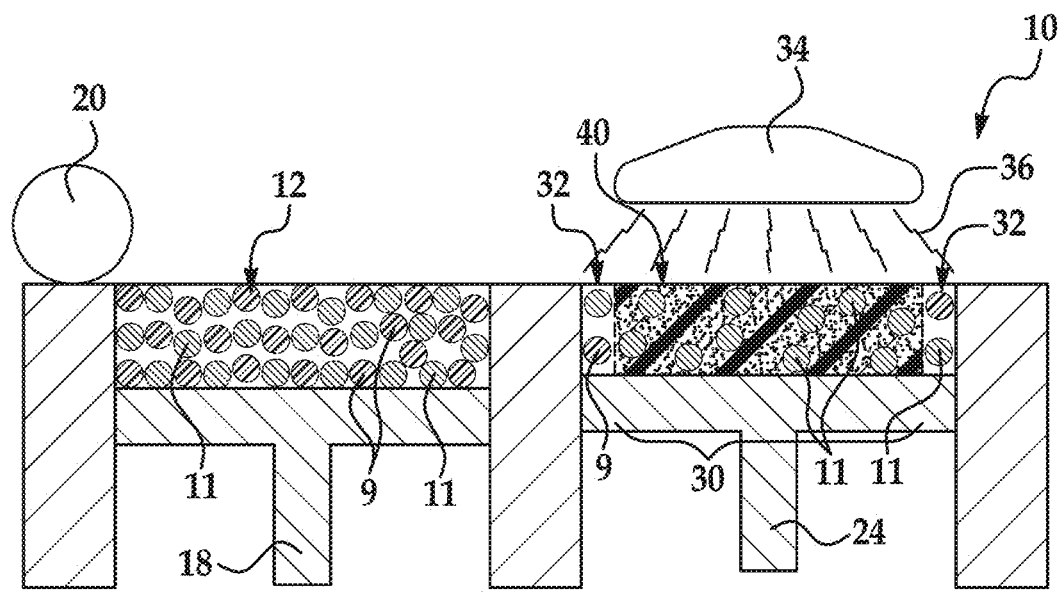

After the liquid functional material 26 is selectively applied in the desired area(s) or portion(s) 30, the layer 14 (e.g., the entire layer 14) of the composite build material composition 12 and the liquid functional material 26 applied to at least a portion thereof is exposed to electromagnetic radiation 36, whereby the at least the portion (i.e., in area/portion 30) of the composite build material composition 12 in contact with the liquid functional material 26 at least partially fuses (as shown at reference numeral 108 in FIG. 1). This is shown in FIG. 3D. It is to be understood that, in an example, the electromagnetic radiation 36 may be continuously applied from the preheating (FIG. 3B), through the application of the liquid functional material 26 (FIG. 3C), and during the exposure (FIG. 3D).

In addition to using an applied radiation source 34, the fabrication bed 22 (FIG. 3 series)/support member 60 (FIG. 6) may be heated (if further heating is desired). An example of multiple radiation and/or heating sources includes a stationary overhead IR-vis lamp, resistive heaters in the supply and fabrication beds 16, 22, and a moving/travelling vis-IR lamp that can pass over the fabrication bed 22. An example of a single radiation source 34 is a travelling lamp (i.e., without any stationary lamps) that repeatedly moves over the fabrication bed 22 to expose the composite build material composition 12 to radiation 36 and heat.

Further, it is to be understood that portions 32 of the build material composition 12 that do not have the liquid functional material 26 applied thereto absorb little, of the applied radiation 36. For example, the composite build material composition 12 may absorb from about 8% to about 10% of the applied radiation 36. As such, the build material particles 9, 11 within the portion(s) 32 generally do not exceed the melting point(s) of either of the build material particles 9, 11 and do not melt/fuse/cure.

The 3D printing method shown in FIGS. 3A through 3D is a layer by layer build approach, and optical radiation (such as UV to IR, having wavelengths ranging from about 100 nm to about 1 mm, or from about 200 nm to about 3,000 nm) may be desirable. However, it is to be understood that the electromagnetic radiation 36 may range from UV-Vis to infrared, including, e.g., mid-infrared and near-infrared radiation to microwave to radio frequency (RF) radiation. The electromagnetic radiation 36 is emitted from a radiation source 34, such as an IR or near-IR curing lamp, halogen lamps emitting in the visible and near-1R range, IR or near-IR light emitting diodes (LED), a microwave or RF oven, or lasers with the desirable electromagnetic wavelengths. In an example, the light source electromagnetic wavelengths range from about 100 nm (UV) to about 10 μm. In another example, the light source is a near-infrared light source with wavelengths of about 800 nm. In yet another example, the radiation source 34 is an infrared light source with wavelengths of about 2 μm. The radiation source 34 may be attached, for example, to a carriage that also holds the inkjet applicator(s) 28. The carriage may move the radiation source 34 into a position that is adjacent to the fabrication bed 22. The radiation source 34 may be programmed to receive commands from the central processing unit and to expose the layer 14 and applied liquid functional material 26 to electromagnetic energy 36.

The length of time the radiation 36 is applied for, or the energy exposure time, may be dependent, for example, on one or more of: characteristics of the radiation source 34; characteristics of the composite build material composition 12; and/or characteristics of the liquid functional material 26.

The melting and fusing from the exposure to radiation 36 forms one layer 40 of the 3D object 50 (FIGS. 3E and 5) to be formed.

If it is desired to form subsequent layers of the 3D object 50, another layer of the composite build material composition 12 may be applied on the layer 40 of the three-dimensional object 50 (as shown at reference numeral 110 in FIG. 1). The other/additional layer of the composite build material composition 12 may be exposed to radiation 36 to pre-heat (as shown in FIG. 3B). After pre-heating the layer of the composite build material composition 12, the liquid functional material 26 is selectively applied on at least a portion of the other layer of the build material composition 12, as shown at reference number 112 in FIG. 1 and in FIG. 3C. After the liquid functional material 26 is selectively applied in the desired area(s) or portion(s), the composite build material composition 12 layer (e.g., the entire build material composition 12 layer) and the liquid functional material 26 applied to at least a portion thereof is exposed to electromagnetic radiation 36, whereby the polymer particle 9 within the at least the portion of the other layer of the build material composition 12 in contact with the liquid functional material 26 at least partially melts and fuses (as shown at reference numeral 114 in FIG. 1 and in FIG. 3D). The melting and fusing from the exposure to radiation 36 forms the continuous polymer phase that encapsulates the inorganic particles 11. Upon solidification of the continuous polymer phase (having the inorganic particles 11 therein), a second layer 42 of the 3D object 50 (FIGS. 3E and 5) is formed.

It is to be understood that reference numerals 110 through 114 of FIG. 1 may be repeated as many times as desirable to create subsequent layers 42, 44, 46 (FIGS. 3E and 5) and to ultimately form the 3D object 50. It is to be understood that heat absorbed during the application of energy from the portion 30 of the build material composition 12 on which liquid functional material 26 has been delivered or has penetrated may propagate to a previously solidified layer, such as layer 40, causing at least some of the polymer within that layer to heat up above its melting point. This effect helps create strong interlayer bonding between adjacent layers of the 3D object 50.

It is to be understood that the subsequently formed layers 42, 44, 46 may have any desirable shape and/or thickness and may be the same as, or different from any other layer 40, 42, 44, 46, depending upon the size, shape, etc. of the 3D object 50 that is to be formed.

Figure 3E:
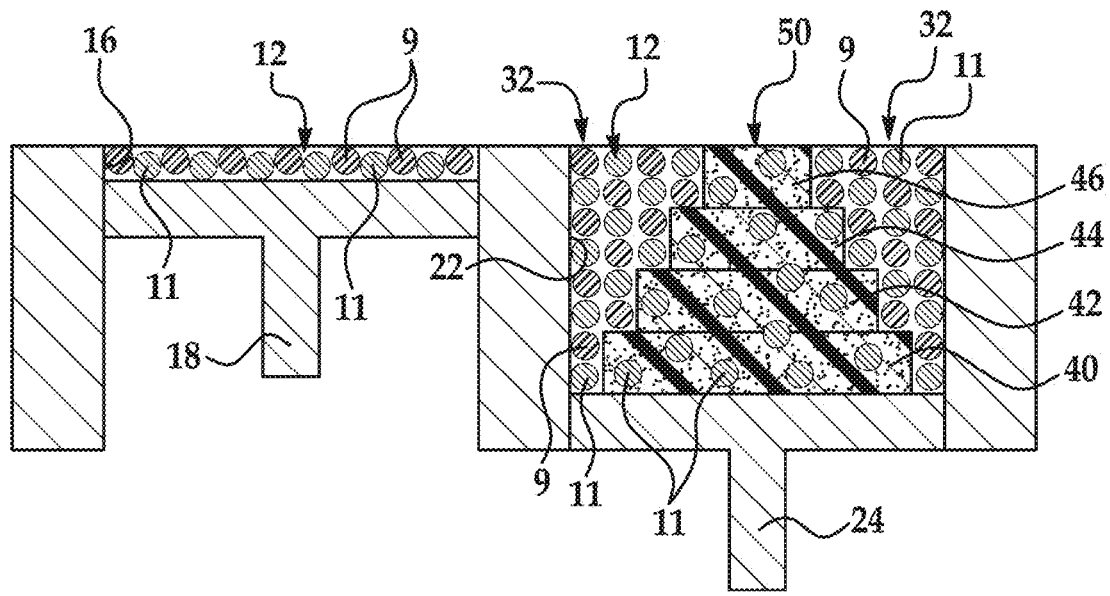
FIG. 3E is a semi-schematic, cross-sectional view of an example of the 3D object that may be formed after performing FIGS. 3A through 3D several times.

As illustrated in FIG. 3E, as subsequent layers 42, 44, 46 have been formed, the delivery piston 18 is pushed closer to the opening of the delivery bed 16, and the supply of the build material composition 12 in the delivery bed 16 is diminished (compared, for example, to FIG. 3A at the outset of the method 100). The fabrication piston 24 is pushed further away from the opening of the fabrication bed 22 in order to accommodate the subsequent layer(s) of build material composition 12 and selectively applied liquid functional material 26. Since at least some of the build material composition 12 remains unfused after each layer 40, 42, 44, 46 is formed, the 3D object 50 in the fabrication bed 22 is at least partially surrounded by the non-fused build material composition 12.

When the 3D object 50 is formed, it may be removed from the fabrication bed 22, and exposed to a cleaning process that removes non-fused build material composition 12 from the 3D object 50. Some examples of the cleaning process include brushing, water-jet cleaning, sonic cleaning, blasting, and combinations thereof. The non-fused build material composition 12 remaining in the fabrication bed 22 may be reused depending, in part, on process conditions. In an example, the used non-fused build material composition 12 may be reused when mixed with fresh build material composition 12 in proportions up to about 80:20 (i.e., 80% used to 20% fresh).

In some examples, the 3D object 50 may also be exposed to an annealing process. Annealing the 3D object 50 may be accomplished at a temperature that is below the melting temperature of the polymer particle 9 (for crystalline polymers) or below the glass transition temperature of the polymer particle 9 (for amorphous polymers). Exposing the 3D object 50 to a temperature that is slightly below (e.g., from 5° to about 60° below) the melting temperature or glass transition temperature of the polymer particle 9 can help relieve built in stresses.

Figure 5:
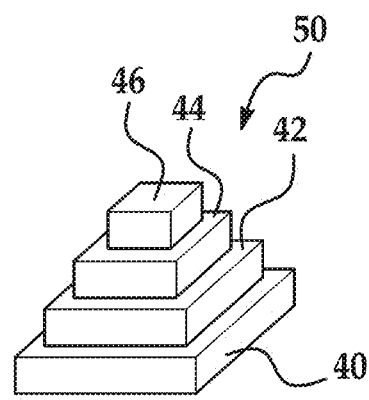
FIG. 5 is a perspective view of the 3D object of FIG. 3E.

FIG. 5 illustrates a perspective view of the 3D object 50. Each of the layers 40, 42, 44, 46 includes fused 9 and particles 11 embedded therein.

Figure 6:
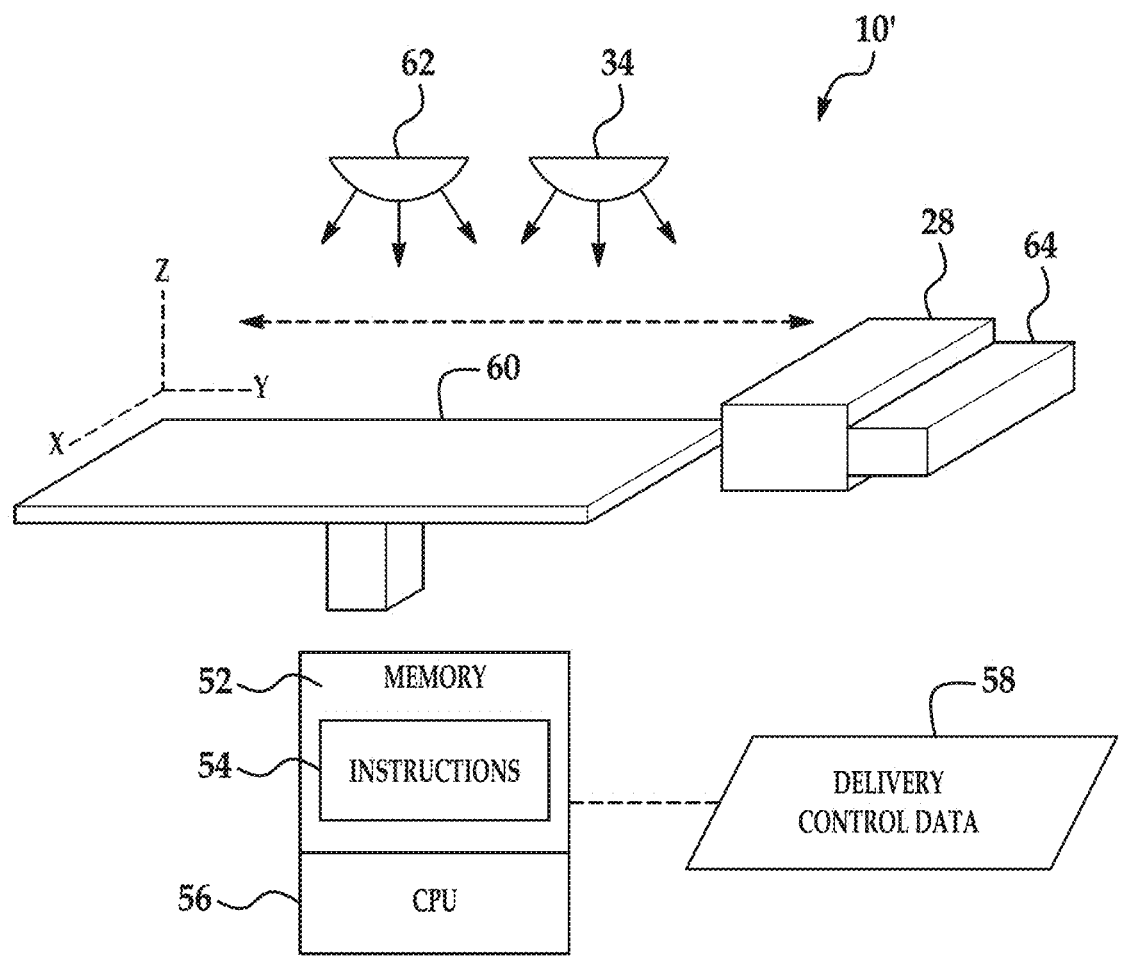
FIG. 6 is a simplified schematic isometric view of an example of a 3D printing system that may be used in an example of the 3D printing method disclosed herein.

Referring now to FIG. 6, another example of the printing system 10' is depicted. The system 10' includes a central processing unit (CPU) 56 that controls the general operation of the additive printing system 10'. As an example, the central processing unit 56 may be a microprocessor-based controller that is coupled to a memory 52, for example via a communications bus (not shown). The memory 52 stores the computer readable instructions 54. The central processing unit 56 may execute the instructions 54, and thus may control operation of the system 10' in accordance with the instructions 54.

In this example, the printing system 10' includes the inkjet applicator 28 to selectively deliver/apply the liquid functional material 26 to a layer 14 (not shown in this figure) of composite build material composition 12 provided on a support member 60. In an example, the support member 60 has dimensions ranging from about 10 cm by 10 cm up to about 100 cm by 100 cm, although the support member 60 may have larger or smaller dimensions depending upon the 3D object 50 that is to be formed.

The central processing unit 56 controls the selective delivery of the liquid functional material 26 to the layer 14 of the build material composition 12 in accordance with delivery control data 58.

In the example shown in FIG. 6, it is to be understood that the inkjet applicator 28 is a printhead, such as a thermal printhead or a piezoelectric inkjet printhead. The inkjet applicator 28 may be a drop-on-demand printhead or a continuous drop printhead.

The inkjet applicator 28 may be used to selectively deliver the liquid functional material 26. As described above, the liquid functional material 26 includes an aqueous vehicle (such as water), and, in some instances, other suitable components, such as a co-solvent, a surfactant, etc., to facilitate its delivery via the inkjet applicator 28.

In one example, the inkjet applicator 28 may be selected to deliver drops of the liquid functional material 26 at a resolution ranging from about 300 dots per inch (DPI) to about 1200 DPI. In other examples, the inkjet applicator 28 may be selected to be able to deliver drops of the liquid functional material 26 at a higher or lower resolution.

The inkjet applicator 28 may include an array of nozzles through which the inkjet applicator 28 is able to selectively eject drops of fluid. In one example, each drop may be in the order of about 10 pico liters (pl) per drop, although it is contemplated that a higher or lower drop size may be used. In some examples, inkjet applicator 28 is able to deliver variable size drops.

The inkjet applicator 28 may be an integral part of the printing system 10', or it may be user replaceable. When the inkjet applicator 28 is user replaceable, it may be removed from and inserted into a suitable distributor receiver or interface module (not shown).

In another example of the printing system 10', a single inkjet printhead may be used to selectively deliver different liquid functional material fluids 26. For example, a first set of printhead nozzles of the printhead may be configured to deliver one of the fluids 26, and a second set of printhead nozzles of the printhead may be configured to deliver another of the fluids 26.

As shown in FIG. 6, the inkjet applicator 28 has a length that enables it to span the whole width of the support member 60 in a page-wide array configuration. In an example, the page-wide array configuration is achieved through a suitable arrangement of multiple inkjet applicators 28. In another example, the page-wide array configuration is achieved through a single inkjet applicator 28 with an array of nozzles having a length to enable them to span the width of the support member 60. In other examples of the printing system 10', the inkjet applicator 28 may have a shorter length that does not enable them to span the whole width of the support member 60.

While not shown in FIG. 6, it is to be understood that the inkjet applicator 28 may be mounted on a moveable carriage to enable it to move bi-directionally across the length of the support member 60 along the illustrated Y-axis. This enables selective delivery of the liquid functional material 26 across the whole width and length of the support member 60 in a single pass. In other examples, the inkjet applicator 28 may be fixed while the support member 60 is configured to move relative thereto.

As used herein, the term 'width' generally denotes the shortest dimension in the plane parallel to the X and Y axes shown in FIG. 6, and the term 'length' denotes the longest dimension in this plane. However, it is to be understood that in other examples the term 'width' may be interchangeable with the term 'length'. As an example, the inkjet applicator 28 may have a length that enables it to span the whole length of the support member 60 while the moveable carriage may move bi-directionally across the width of the support member 60.

In examples in which the inkjet applicator 28 has a shorter length that does not enable them to span the whole width of the support member 60, the inkjet applicator 28 may also be movable bi-directionally across the width of the support member 60 in the illustrated X axis. This configuration enables selective delivery of the liquid functional material 26 across the whole width and length of the support member 60 using multiple passes.

The inkjet applicator 28 may include therein a supply of the liquid functional material 26, or may be operatively connected to a separate supply of the liquid functional material 26.

As shown in FIG. 6, the printing system 10' also includes a build material distributor 64. This distributor 64 is used to provide the layer (e.g., layer 14) of the composite build material composition 12 on the support member 60. Suitable build material distributors 64 may include, for example, a wiper blade, a roller, or combinations thereof.

The composite build material composition 12 may be supplied to the build material distributor 64 from a hopper or other suitable delivery system. In the example shown, the build material distributor 64 moves across the length (Y axis) of the support member 60 to deposit a layer of the build material composition 12. As previously described, a first layer of composite build material composition 12 will be deposited on the support member 60, whereas subsequent layers of the composite build material composition 12 will be deposited on a previously deposited (and solidified) layer.

It is to be further understood that the support member 60 may also be moveable along the Z axis. In an example, the support member 60 is moved in the Z direction such that as new layers of build material composition 12 are deposited, a predetermined gap is maintained between the surface of the most recently formed layer and the lower surface of the inkjet applicator 28. In other examples, however, the support member 60 may be fixed along the Z axis, and the inkjet applicator 28 may be movable along the Z axis.

Similar to the system 10, the system 10' also includes the radiation source 34 to apply energy when desired to the deposited layer of build material composition 12 and the selectively applied liquid functional material 26. Any of the previously described radiation sources 34 may be used. In an example, the radiation source 34 is a single energy source that is able to uniformly apply energy to the applied materials, and in another example, radiation source 34 includes an array of energy sources to uniformly apply energy to the deposited materials.

In the examples disclosed herein, the radiation source 34 may be configured to apply energy in a substantially uniform manner to the whole surface of the deposited build material composition 12. This type of radiation source 34 may be referred to as an unfocused energy source. Exposing the entire layer to energy simultaneously may help increase the speed at which a three-dimensional object 50 may be generated.

While not shown, it is to be understood that the radiation source 34 may be mounted on the moveable carriage or may be in a fixed position.

The central processing unit 56 may control the radiation source 34. The amount of energy applied may be in accordance with delivery control data 58.

The system 10' may also include a pre-heater 62 that may be used to pre-heat the support member 60 and/or the deposited build material composition 12 (as described above). Still further, the system 10' may include tools and components to perform the cleaning previously described.

To further illustrate the present disclosure, examples are given herein. It is to be understood that these examples are provided for illustrative purposes and are not to be construed as limiting the scope of the present disclosure.

EXAMPLES

Example 1

A composite build material composition was formed by mixing nylon 12 (aliphatic polyamide 12) polymer particles (melting temperature about 190° C.) with AA-18 alumina particles (available from Sumitomo Chemical). The average particle size of the nylon 12 particles was about 50 µm and the average particle size of the AA-18 alumina particles was about 18 µm. The mass ratio of the nylon 12 particles to the AA-18 alumina particles was 1:1.

A part was formed by:
1) Spreading a layer (about 100 mm thick) of the composite build material on the surface of printer powder bed;
2) Digital patterning of the spread composite build material surface using an HP940 printhead cartridge with black ink containing a carbon black dispersion as a radiation absorber;
3) Irradiation of the powder bed surface by high power halogen lamps immediately after the patterning. Absorption of radiation by the patterned surface raised the build material composition temperature to a temperature ranging from about 180° C. to about 190° C. and resulted in the melting and fusing of the nylon 12 particles and incorporation of the AA-18 alumina particles into the polymer melt; and
4) Spreading of a fresh layer of the build material surface on top of previously fused layer and repeat steps (2)-(3). Several layers were formed.

Figure 7:
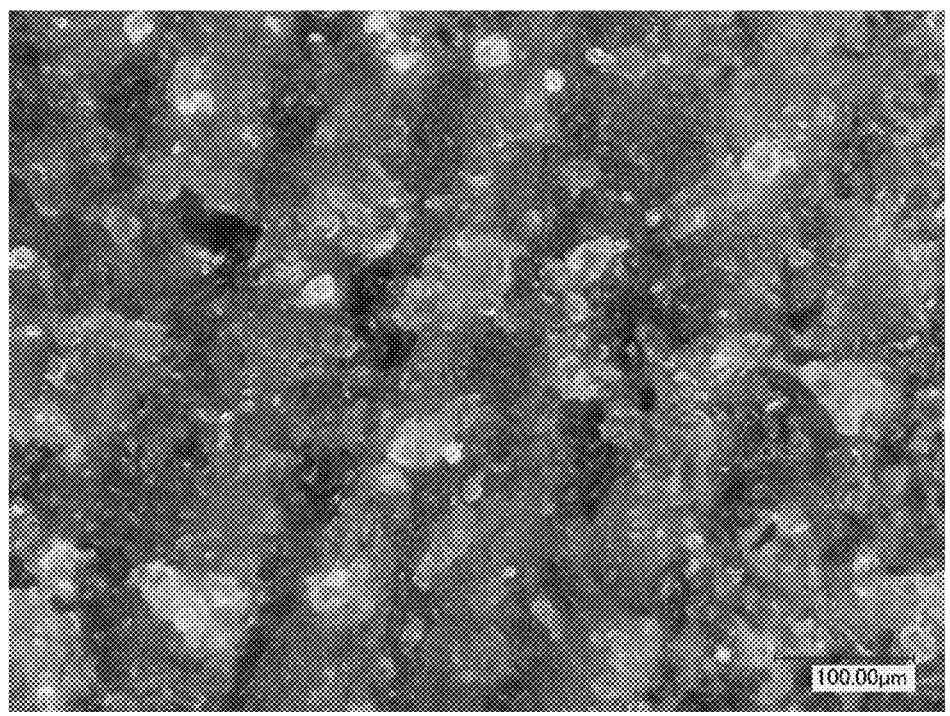
FIG. 7 is a microscope image (at 500× magnification) showing an example of a portion of a part formed with an example of the composite build material composition (1:1 mass ratio of polyamide 12:AA-18 alumina powder)

The resulting part was fractured, and microscopy images (at 500× magnification) of the interior of the fractured portion were taken, and one image is shown in FIG. 7. Several layers of the part are visible in FIG. 7, and appear as slightly diagonal layers slanted from the bottom left of the figure toward the top right. As depicted in FIG. 7, the individual AA-18 alumina particles (the lighter, spherical particles in FIG. 7) were substantially uniformly dispersed in the polymer phase (which appears as a darker, more continuous portion in FIG. 7).

This Example illustrates the ability to form a part that is made up of composite polymer material having inorganic particles uniformly dispersed therein without having to first form a compounded particle.

Example 2

In this example, rectangular bar objects (coupons) were 3D printed in a test-bed printed using a composite build material composition of nylon 12 (aliphatic polyamide 12) polymer particles (melting temperature about 190° C.) with AA-18 alumina particles (available from Sumitomo Chemical). The average particle size of the nylon 12 particles was about 50 μm and the average particle size of the AA-18 alumina particles was about 18 μm. Two compositions were tested, one having a mass ratio of the nylon 12 particles to the AA-18 alumina particles of 1:1, and the other having a mass ratio of the nylon 12 particles to the AA-18 alumina particles of 1:2. The nylon 12 particles alone (without AA-18 alumina particles) was used as a control.

Fabrication of the example coupons was performed through repeated sequence of the following:

1) Spreading a layer (about 100 mm thick) of the 1:1 or 1:2 nylon 12 particle:AA-18 alumina particle mix on the surface of printer powder bed;

2) Digital patterning of the spread powder surface using an HP940 printhead cartridge with black ink containing a carbon black dispersion as a radiation absorber;

3) Irradiation of the powder bed surface by high power halogen lamps immediately after the patterning. Absorption of radiation by the patterned surface raised the build material composition temperature above the melting temperature of the nylon 12 particles (i.e. >186° C.) and resulted in the melting and fusing of the nylon 12 particles and incorporation of the AA-18 alumina particles into the polymer melt; and 4) Spreading of a fresh layer of the nylon 12 particle:AA-18 alumina particle mix on top of previously fused layer and repeat steps (2)-(3). Up to 150 layers have been tested.

A similar process was used to form the comparative coupons, except that the layer for the comparative coupons included the nylon 12 particles alone (without AA-18 alumina particles).

Mechanical properties of the coupons printed from both build material mixes as well as from the control nylon 12 particles were tested on TA Instruments Q800 DMA in single cantilever mode. Stiffness and coefficient of thermal expansion (CTE) of the tested coupons are presented in FIGS. 8 and 9, respectively.

Figure 8:
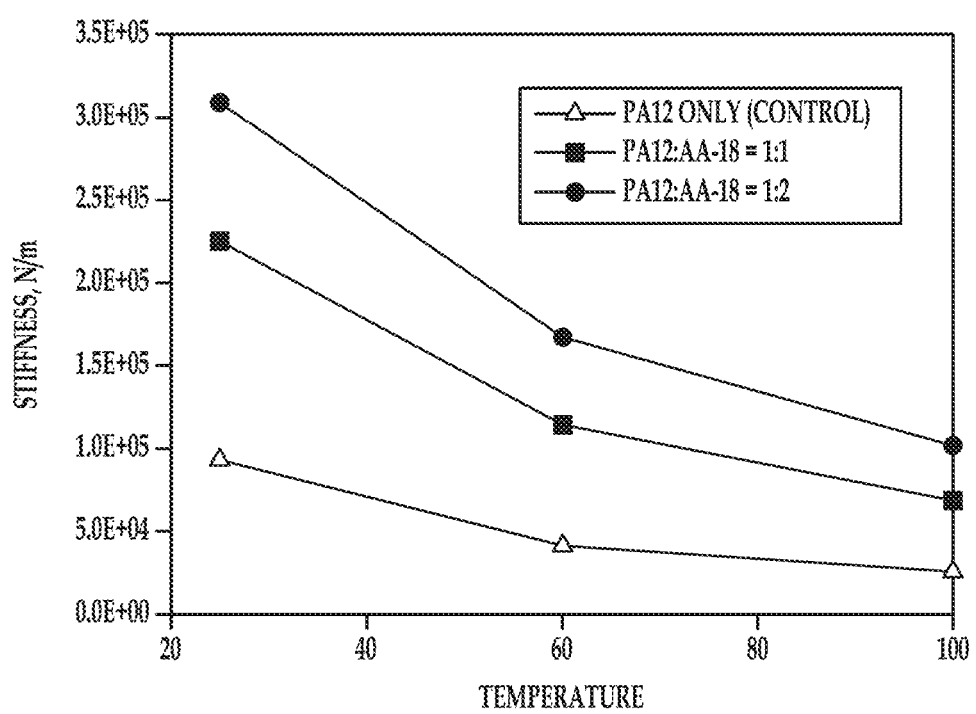
FIG. 8 is a graph depicting the stiffness (N/m) of example and comparative example coupons at different temperatures.
Figure 9:
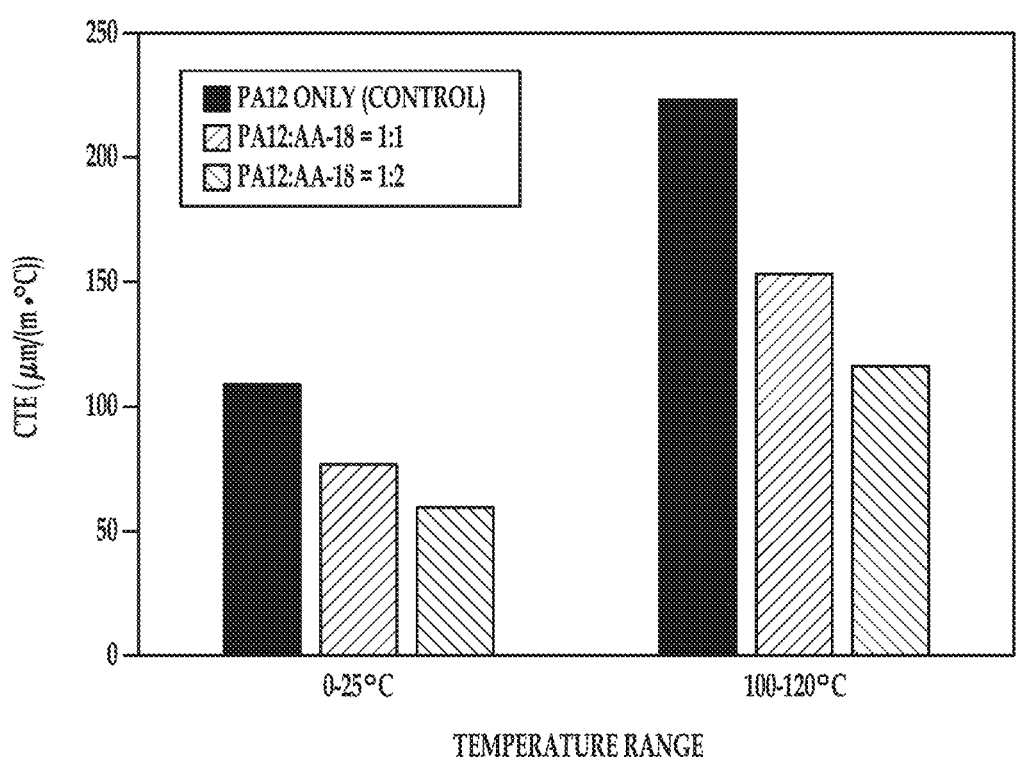
FIG. 9 is a bar graph depicting the coefficient of thermal expansion (CTE, $\mu m/(m \cdot °C.)$) of example and comparative example coupons at different temperatures ranges.

In FIGS. 8 and 9, the comparative coupon is labeled PA-12 only (Control) and the example coupons are labeled PA12:AA-18=1:1 and PA12:AA-18=1:2.

Compared with the comparative coupon, both of the example coupons exhibited an increase in the material stiffness at all temperatures ranging from 20° C. to 100° C. (FIG. 8), as well as a decrease in the coefficient of thermal expansion at both temperature ranges tested (0-25° C. and 100-120° C.). The significant increase of the material stiffness for the example coupons preserved at elevated temperatures as well as reduced coefficient of thermal expansion of the example coupons at various temperatures indicate that mixing of polyamide and alumina powders may significantly improve mechanical properties and dimensional stability of 3D objects printed from aliphatic polyamides.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 μm to about 250 μm should be interpreted to include not only the explicitly recited limits of about 1 μm to about 250 μm, but also to include individual values, such as 12 μm, 94.5 μm, 225 μm, etc., and sub-ranges, such as from about 30 μm to about 125 μm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing composite build material composition, comprising:
    a polymer particle, wherein the polymer particle is an aliphatic polyamide; and
    an inorganic particle, the inorganic particle having an average particle size ranging from about 1 μm to about 100 μm;
    wherein a mass ratio of polymer particle to inorganic particle in the composite build material composition ranges from about 5:2 to about 1:3,
    wherein the inorganic particle is selected from the group consisting of metal oxides, semiconductor oxides, inorganic glasses, carbides, nitrides, borides, and combinations thereof,
    wherein the inorganic particle is selected from the group consisting of alumina ($Al_2O_3$), $Na_2O/CaO/SiO_2$ glass (soda-lime glass), silicon dioxide ($SiO_2$), zirconia ($ZrO_2$), titanium dioxide ($TiO_2$), and combinations thereof, and
    wherein the inorganic particle is a combination of 30 wt % soda-lime glass mixed with 70 wt % alumina.

2. The 3D printing composite build material composition as defined in claim 1 wherein the polymer particle has an average particle size ranging from about 1 μm to about 100 μm.

3. The 3D printing composite build material composition as defined in claim 1 wherein the aliphatic polyamide is selected from the group consisting of polyamide 12, polyamide 11, and combinations thereof.

4. The 3D printing composite build material composition as defined in claim 1, further comprising a flow aid present in an amount up to about 2 wt % of a total wt %° of the composite build material composition.

5. The 3D printing composite build material composition as defined in claim 1 wherein the mass ratio of the polymer particle to the inorganic particle ranges from about 1:1 to about 1:2.

* * * * *